United States Patent [19]

Maebayashi et al.

[11] Patent Number: 4,708,389
[45] Date of Patent: Nov. 24, 1987

[54] OPEN TOP TYPE AUTOMOBILE BODY STRUCTURE

[75] Inventors: Jiro Maebayashi; Masaya Hamamoto, both of Hiroshima, Japan

[73] Assignee: Mazda Motor Corporation, Hiroshima, Japan

[21] Appl. No.: 801,837

[22] Filed: Nov. 26, 1985

[30] Foreign Application Priority Data

Dec. 3, 1984 [JP] Japan .................................. 59-255223
Dec. 3, 1984 [JP] Japan ........................... 59-183460[U]

[51] Int. Cl.$^4$ ............................ B60J 7/11; B60J 7/12; B60J 7/195
[52] U.S. Cl. .................................... 296/107; 296/218; 280/756
[58] Field of Search ............... 296/107, 109, 108, 111, 296/117, 118, 112, 218, 216, 219, 136; 280/756

[56] References Cited

U.S. PATENT DOCUMENTS

| | | | |
|---|---|---|---|
| 2,711,924 | 6/1955 | Orr | 296/107 |
| 3,222,103 | 12/1965 | Wernig et al. | 296/136 |
| 3,236,557 | 2/1966 | Podolan | 296/107 |
| 4,557,502 | 12/1985 | Scaduto et al. | 296/186 |
| 4,572,570 | 2/1986 | Trucco | 296/107 |

FOREIGN PATENT DOCUMENTS

| | | | |
|---|---|---|---|
| 814396 | 9/1951 | Fed. Rep. of Germany | 296/107 |
| 2086316 | 5/1982 | United Kingdom | 296/107 |

*Primary Examiner*—Dennis H. Pedder
*Attorney, Agent, or Firm*—Fleit, Jacobson, Cohn & Price

[57] ABSTRACT

An open top automobile body having a hoop member which is mounted for swinging movement between an erected position and a retracted position. A rigid roof panel is removably mounted to extend between the front windshield and the hoop member. A foldable rear hood having a rigid transparent glass is provided to cover the rear body section. The rear hood is secured to the rear body section at a position below the upper edge of the rear body section. A peripheral hood tensioning link is provided to force the hood against the upper edge of the rear body section substantially over an entire outer periphery of the hood link.

17 Claims, 14 Drawing Figures

OPEN TOP TYPE AUTOMOBILE BODY STRUCTURE

BACKGROUND OF THE INVENTION

1. Field of the Invention

The present invention relates to an automobile upper body structure, and more particularly to an automobile upper body structure of an open top type. More specifically, the present invention pertains to a full open type automobile upper body structure wherein the roof panel and the rear windshield can be removed and/or fully retracted.

2. Description of Prior Art

Conventionally, an open top type automobile includes a foldable hood which normally covers the top and rear sections when extended for bad weather operations but can be folded rearward to completely open the top and rear sections of the upper body structure for operations in fine weather. It has, however, been experienced in this type of body structure that it is difficult to maintain the weather tight properties throughout the life of the automobile since the seals between the hood and the front windshield and/or the side windows are apt to be broken. Another inconvenience in this type of automobile body is that the hood has a tendency of producing wind noises in high speed operation.

Another type of open top automobile body is the one which includes a rigid roof panel removably attached to the body between the front and rear windshields. This type of body structure is considered as being free from the problems as pointed above in connection with the body structure having a rearwardly foldable hood. It should, however, be noted that this type is disadvantageous in that the rear windshield panel remains, even when the rigid roof panel is removed.

In the British Pat. No. 2086316, there is disclosed an open top automobile body structure including a hoop member of an inverted U-shape having a pair of leg portions swingably attached to the rear body portion at the opposite sides thereof. A foldable rear hood section is provided between the hoop member and the rear body portion to provide a rear windshield section when the hoop member is in the erected position. A rigid roof panel is provided so as to be mounted to extend between the front windshield structure and the hoop member to cover the top of the passenger compartment. The rigid roof panel is removable and the hoop member can be swung rearward from the erected position to the retracted position simultaneously folding the rear hood section. The body structure as disclosed by the British patent eliminates the problems of the open top automobile body structure having a rearwardly foldable hood because it has a rigid roof structure. Further, it also eliminates the problem of the conventional open top body haing a rigid roof panel because the rear hood section can be retracted. The rear hood section is secured, in the structure of the British patent, at the front edge to the hoop member and at the side and rear edges to the upper edge of the rear body section. Thus, in the retracted position, the rear hood section is folded and stored in a space defined in the rear body section, and the hoop member is placed on the folded rear hood section.

In the structure disclosed by the British patent, it is desirable that the hoop member as well as the rear hood section can be retracted to positions below the upper edge of the rear body section. It should however be noted that retracting the hoop member and the rear hood section to such positions is not compatible with getting a sufficiently wide rear view through the rear hood section. In order to have a rear view through the rear hood section, the rear hood section is provided with a transparent part which is conventionally made of a synthetic material. However, the transparent part made of a synthetic material is apt to be scratched, losing its transparency in use. Further, it is very difficult to maintain a planar configuration throughout a prolonged use of the vehicle so that the vision through the transparent part of the rear hood section will become distorted due to possible deformations of the transparent part in its use.

It is therefore recommendable to make the transparent part by a glass material. However, since the glass is not flexible, it causes a restriction in folding the rear hood section. In order to have the rear hood section retracted into the storing space with the front edge portion secured to the hoop member and the side and rear edge portions secured to the upper edge of the rear body section, it is required to have flexible parts of the rear hood section folded on the rigid transparent part which is made of glass. If the flexible parts can be folded around the transparent part, the hoop member and the rear hood section can be retracted to positions below the upper edge of the rear body section. It should however be noted that this design will undesirably decrease the field of vision through the transparent part of the rear hood section. Contrary to this, if the transparent part is made sufficiently large, it will become difficult to retract the hoop member to a sufficiently low position so that the hoop member may project beyond the upper edge of the rear body section.

The aforementioned problems may be solved by making the rear hood section removable from the hoop member and/or the rear body section. However, this solution is not recommendable because inconvenient handlings are required in retracting and extending the rear hood section.

SUMMARY OF THE INVENTION

It is therefore an object of the present invention to provide an open top automobile body structure which is free from the aforementioned problems.

Another object of the present invention is to provide an open top structure for an automobile body which includes a rigid roof panel and retractable rear windshield section.

A further object of the present invention is to provide an open top structure for an automobile body having a swingable hoop member and a rear hood section having a front edge portion secured to the hoop member so that it is retractable together with the hoop member.

Still further object of the present invention is to provide a structure for retracting a swingable hoop member together with a rear hood section to a position below the upper edge or edge portion of the rear body section which includes side panels and a rear section.

According to one aspect of the present invention, the above and other objects can be accomplished by an open top automobile body including a body structure having a front windshield section, a rear body section comprising opposite side panels and a rear structure having an upper edge defining an open top, a hoop member of a substantially inverted U-shape having a pair of leg portions swingably mounted respectively on the opposite side panels for movement between an erected position wherein the hoop member extends substantially upright and a retracted position wherein the hoop member is retracted in the rear section, a rigid roof panel adapted to be placed between the front windshield section and the hoop member in the erected position, a foldable rear hood section having a front edge portion secured to the hoop member and side and rear edge portions secured to said rear body section of the body structure, the improvement resides in that said side and rear edge portions of the rear hood section are secured to the rear section of the body structure at positions below the upper edge of the rear section of the body structure, a substantially U-shaped hood tensioning link being provided for movement between an operative position wherein it cooperates with the upper edge of the rear section of the body structure to hold the rear hood section between the link and the upper edge of the rear section of the body structure, and an inoperative position wherein the link is below the upper edge of the rear section of the body structure to release the rear hood section, means being provided for moving the hood tensioning link to the operative position when the hoop member is moved to the erected position and to the inoperative position when the hoop member is moved to the retracted position.

In a preferred aspect of the present invention, the last mentioned means includes means for pivotably connecting leg portions of the hood tensioning link to the leg portions of the hoop member and flexible belt means connecting an intermediate portion of the link to an intermediate portion of the hoop member.

The above and other objects and the features of the present invention will become apparent from the following descriptions of preferred embodiments taking reference to the accompanying drawings.

BRIEF DESCRIPTION OF THE DRAWINGS

FIGS. 4A, B, C and D are sectional views respectively of portions A, B, C and D in FIG. 3;

DESCRIPTION OF THE PREFERRED EMBODIMENTS

Figure 1A:
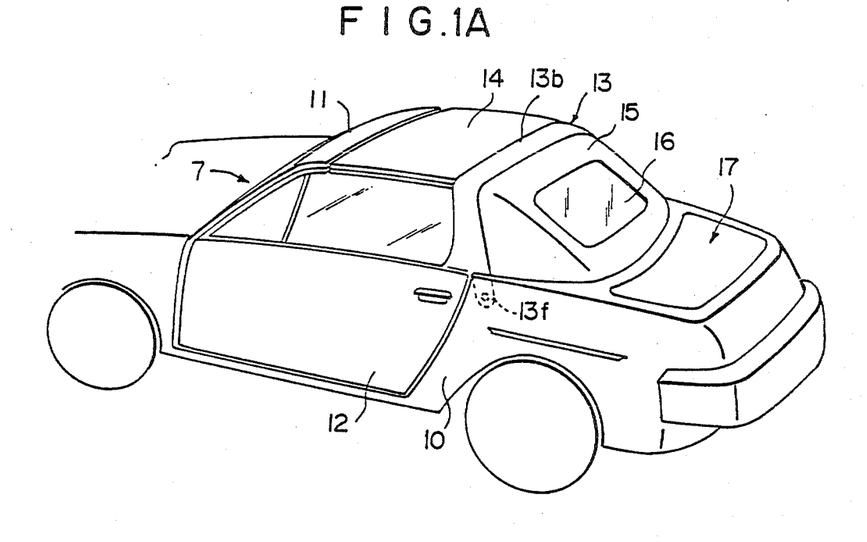
FIG. 1A is a perspective view showing an open top type automobile in accordance with one embodiment of the present invention.
Figure 1B:
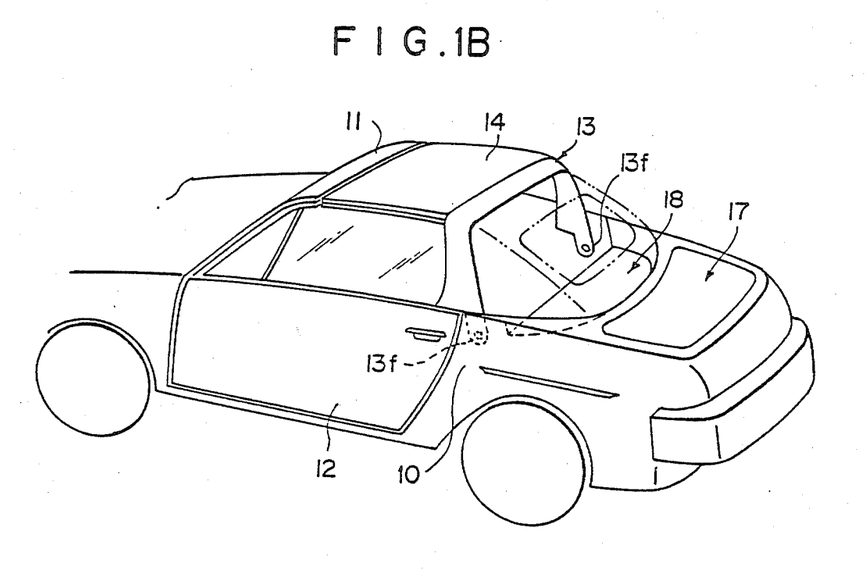
FIG. 1B is a perspective view with the rear hood taken away to show the interior.
Figure 1C:
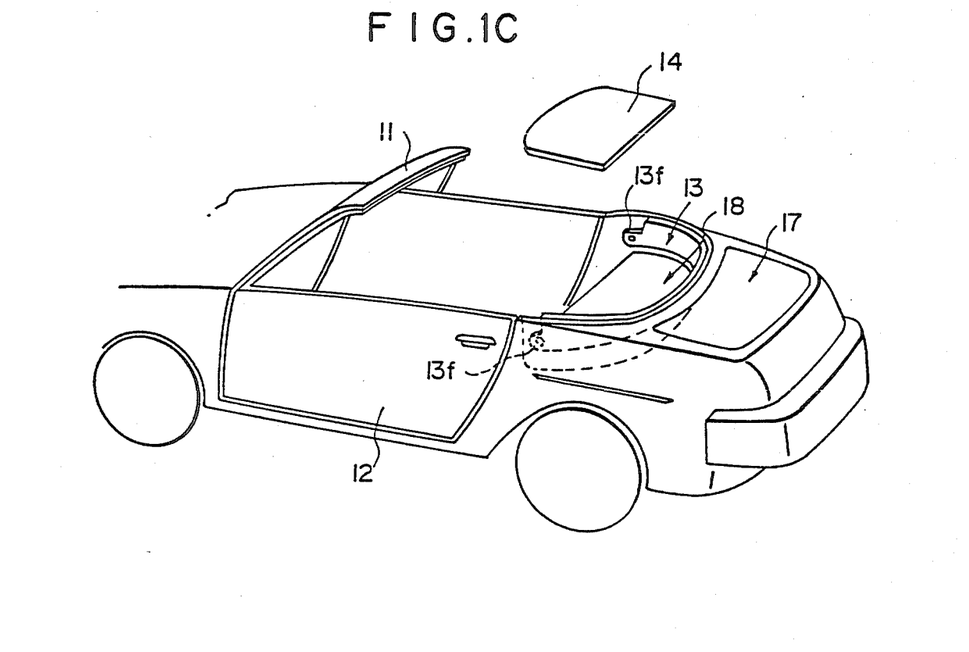
FIG. 1C is a perspective view with the roof panel removed and the hoop member in the retracted positions.

Referring to the drawings, particularly to FIGS. 1A, 1B and 1C, there is shown an automobile body having a hoop member 13 of a substantially inverted U-shape including opposite leg portions connected at the lower end portions 13f to rear fenders 10 of the rear body section 17 so that the hoop member 13 can be swingably moved between an erected position shown in FIG. 1A and a retracted position shown in FIG. 1C. A rigid roof panel 14 is positioned to extend between a front header 11 of a front windshield section 7 and the top portion 13b of the hoop member 13 in the erected position. As usual, side doors 12 are provided in front of the rear fenders 10. The roof panel 14 is removably attached to the front header 11 of the front windshield section 8 and the top portion 13b of the hoop member 13 respectively at the front and rear edge portions.

A rear hood 15 having a central transparent glass 16 is provided between the hoop member 13 and the rear body section 17 so as to constitute a rear windshield of the body. The rear hood 15 has a front edge portion secured to the hoop member 13 and side and rear edge portions secured to the rear body section 17.

Figure 2A:
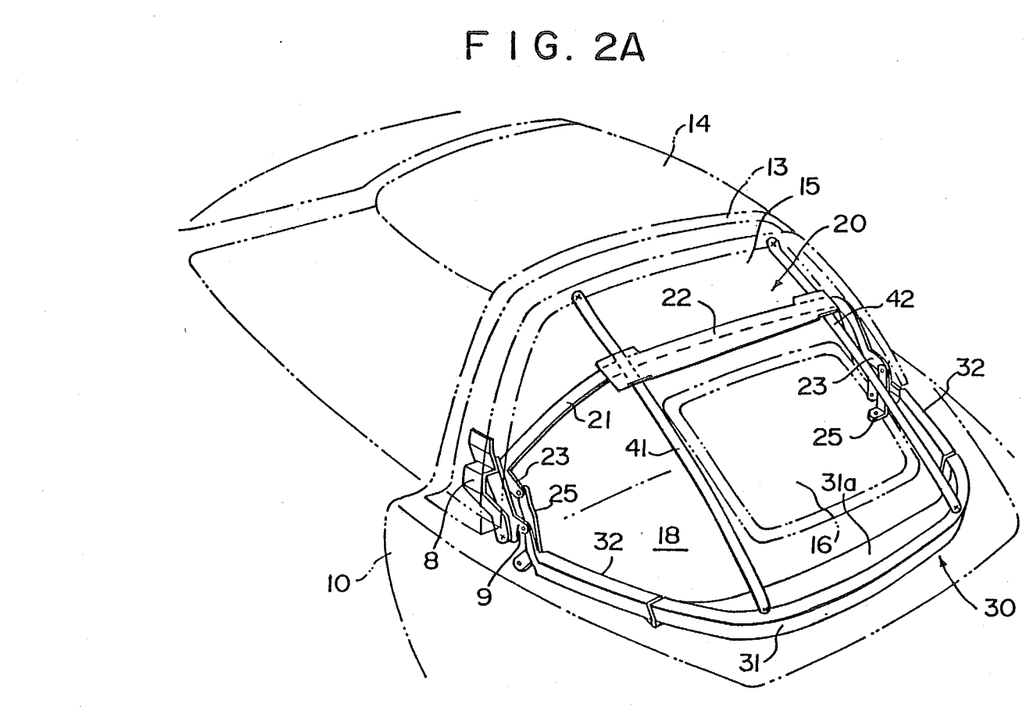
FIG. 2A is a perspective view showing the hood tensioning link mechanism.

As shown in FIG. 1B, the body is formed with a storage space 18 in the rear body section 17 for receiving the hoop member 13 and the rear hood 15. For opening the top of the passenger compartment, the roof panel 14 is at first removed and the hood member 13 is swingably moved rearward to the position shown in FIG. 1C so that the hoop member 13 and the rear hood 15 are received in the space 18. In the erected position of the hoop member 13, the rear hood 15 is positioned to cover the top of the rear body section 17. In order to have the hood 15 tensioned in this position, a link mechanism is provided as shown in FIG. 2A. This link mechanism includes an upper hood tensioning linkage 20 and a peripheral hood stretching linkage 30. The upper hood tensioning linkage 20 includes a tensioning bar 22 carried by an upper link 21 which is of a substantially inverted U-shaped. The tensioning bar 22 is adapted to be engaged with the rear hood 15 between the transparent glass 16 and the hoop member 13. At each end, the upper link 21 is formed with a lug 23 connected with an upper end of a lower link 25. The lower link 25 has a lower end pivotably connected to the rear fender 10.

Figure 2B:
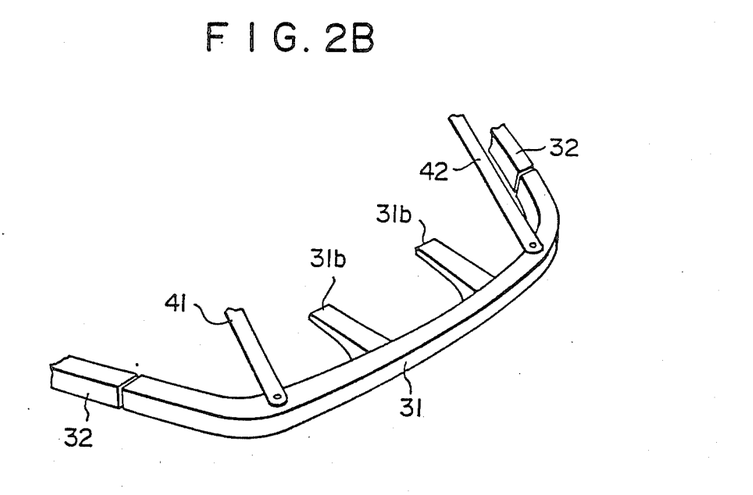
FIG. 2B is a perspective view showing a different example of the hood tensioning link.

The peripheral hood tensioning linkage 30 includes a substantially U-shaped rear link 31 having opposite ends connected with rear ends of a pair of front links 32. The front links 32, which constitute leg portions of linkage 30 are pivotably connected with the leg portions of the hoop member 13. The rear link 31 is formed at the rear portion thereof with a forwardly projecting deck 31a for receiving the rear edge portion of the glass 16 when the hood 15 is folded. The deck 31a may be substituted by forward projections 31b as shown in FIG. 2B.

A bracket plate 9 is secured to the hoop member 13 through a reinforcement plate 8 to pivotably mount the lower end portion of the upper link 21 of the upper hood tensioning linkage 20. The plate 9 has a lug pivotably connected with the front end of the front link 32 of the peripheral hood tensioning linkage 30. A pair of tensioning belts 41 and 42 extends substantially longitudinally along the inside of the rear hood 15 and have front ends connected to the hoop member 13 and rear ends connected to the rear link 31 of the rear linkage 30. The belts 41 and 42 are passed between the tensioning bar 22 and the upper link 21.

Figure 3:
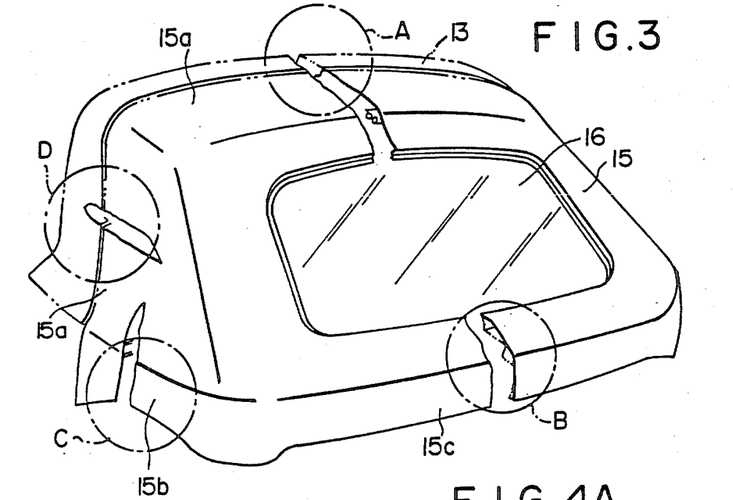
FIG. 3 is a fragmentary rear perspective view showing the rear hood section.
Figures 4A, 4B:
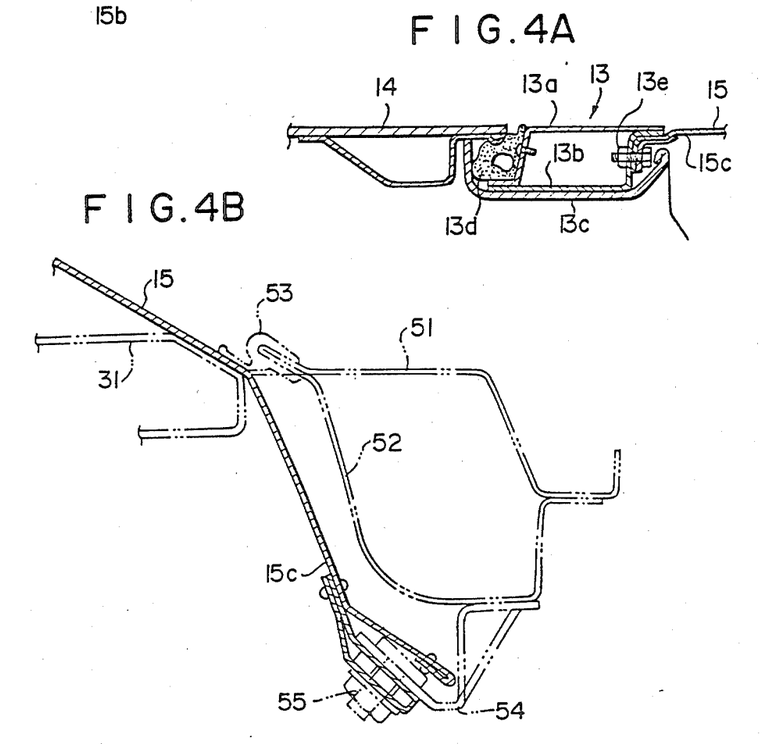

Referring to FIGS. 4A through 4D together with FIG. 3, it will be noted in FIG. 4A that the hoop member 13 is comprised of an outer panel 13a and an inner panel 13b which are welded together to form a structure of closed cross-section. The hoop member 13 has a weather strip 13d along the front edge to provide a weather-tight seal between the roof panel 14 and the hoop member 13. The rear hood 15 is connected at the front edge to the rear edge of the member 13 by means of bolts 13e and the inner surface of the hoop member 1 is covered by an inner trim 13c.

Adjacent to the rear edge portion of the rear hood 15, the rear body section 17 is provided with a front edge structure comprised of an outer panel 51 and an inner panel 52 which are welded together to form a structure of closed cross-section as shown in FIG. 4B. A plate 54 of a substantially S-shaped cross-section is attached to the lower side of the inner panel 52 and the rear edge portion 15c of the hood 15 is secured to the plate 54 by means of bolts 55. At the front edge of the front edge structure, there is a weather strip 53 which is adapted to be engaged with the rear hood 15 to provide a weather-tight seal therebetween. As shown in FIG. 4B, the rear link 31 is positioned to support the hood 15 against the weather strip 53. It will therefore be understood that the rear edge portion 15c is secured to the rear body section 17 at a position below the upper edge of the rear body section 17.

Figure 4C:
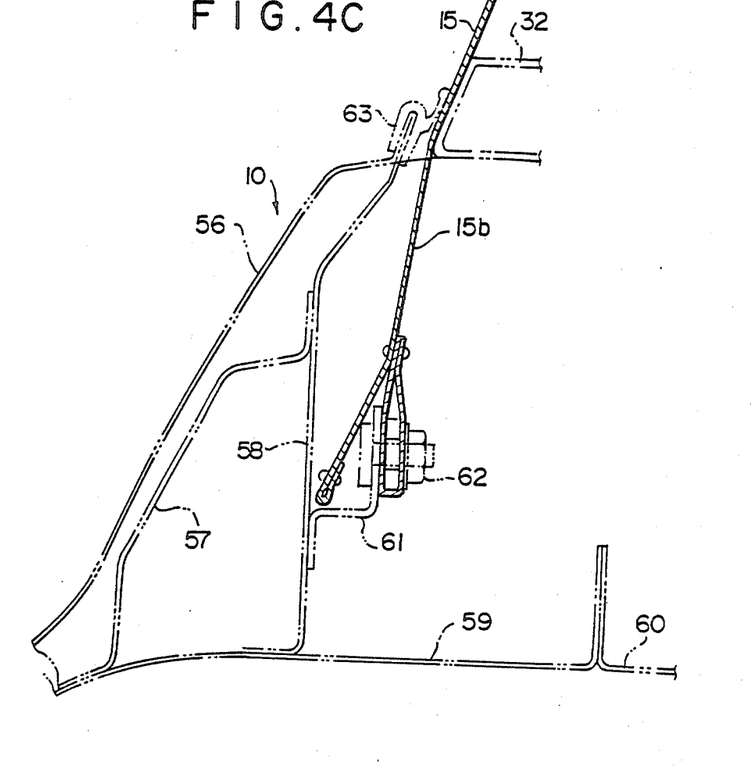

Referring to FIG. 4C, it will be noted that the rear fender 10 includes an outer panel 56 and an inner panel 58 which are welded together at the upper edges. The lower edges of the outer and inner panels 56 and 58 are welded to a tire house outer panel 59 which is welded at an inner edge with a tire house inner panel 60. A reinforcement 57 is welded to the panels 58 and 59. The inner panel 58 of the rear fender 10 has a plate 61 of a substantially Z-shaped cross-section and the side edge portion 15b of the hood 15 is secured to the plate 61 by means of bolts 62. It will therefore be understood that the side edge portion 15b of the rear hood 15 is attached to the rear body section 17 at a position below the upper edge of the rear fender 10. Along the upper edge of the rear fender 10, there is provided a weather strip 63 or seal means which is adapted to be engaged with the hood 11. The front link 32 forces the hood 15 toward the weather strip 63.

Figure 4D:
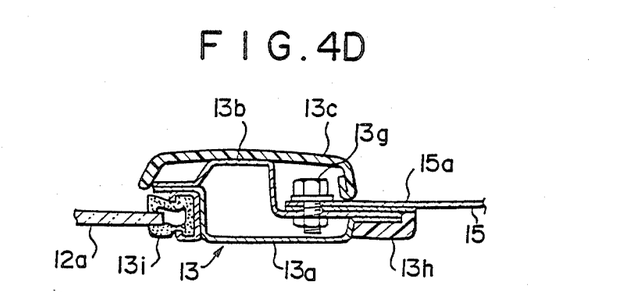

Referring to FIG. 4D, the hoop member 13 is provided along the front edge with a weather strip 13i which is adapted for a weather-tight engagement with the rear edge of the side window glass 12a. A trim 13h is provided along the rear edge of the hoop member 13.

Figure 5:
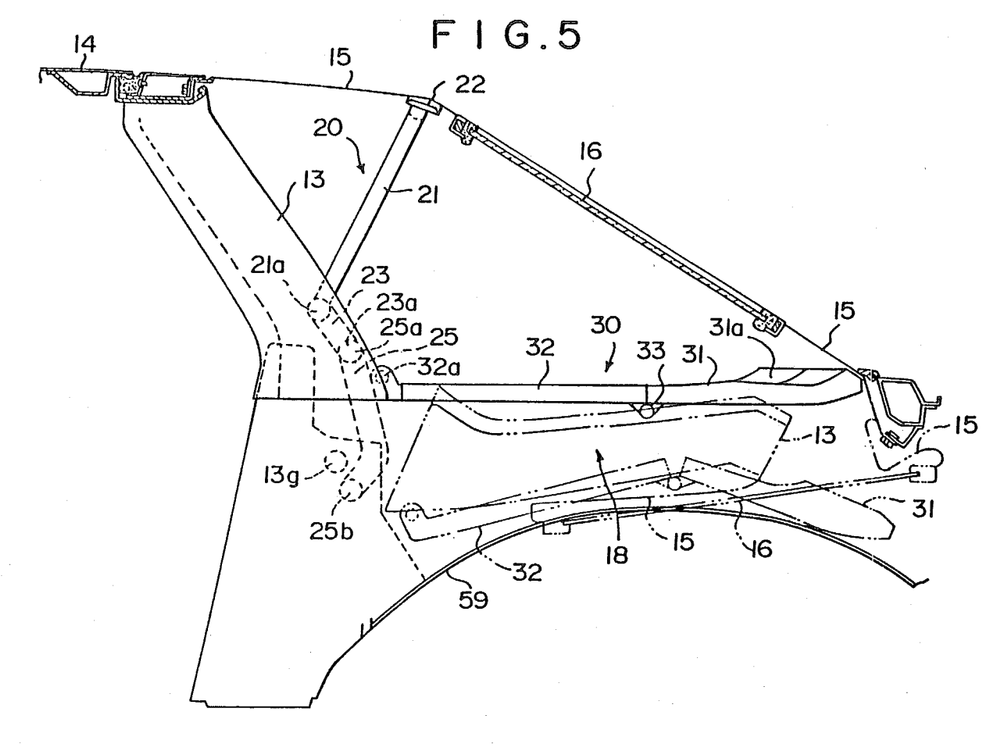
FIG. 5 is a longitudinal sectional view of the rear body section.
Figure 6:
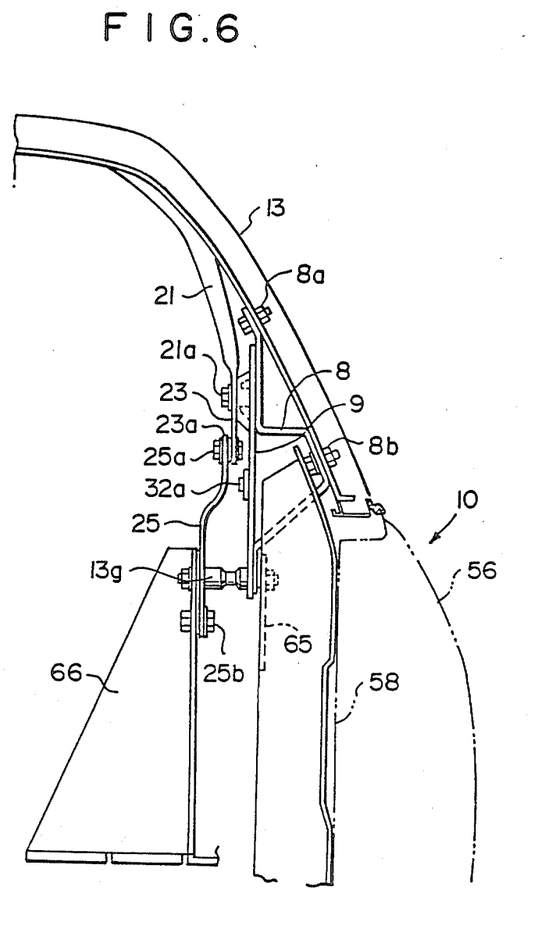
FIG. 6 is a cross-sectional view showing the mounting of the hoop member.

Referring now to FIGS. 5 and 6, it will be noted in FIG. 6 that an upper end portion and an intermediate portion of the aforementioned reinforcement plate 8 is secured to the leg portion of the hoop member 13 by means of bolts 8a and 8b, respectively. The upper and lower ends of the members 8 and 9 are welded together as shown and the members 8 and 9 are pivotally connected to the rear fender 10 by means of a pivot pin 13g. Referring to FIG. 5, it will be noted that the hood 15 has a portion extending forwardly from the tensioning bar 22 substantially horizontally to provide a continuous roof contour. With this arrangement, it becomes possible to provide a large area for the transparent glass 16. In other words, the substantial part of the foldable upper portion of the rear hood 15 is made to extend substantially horizontally in a manner that it does not disturb the rear view. It is therefore possible to make the glass 16 occupy substantial area of the rearwardly inclined part of the rear hood 15. Therefore, it becomes possible to increase the area of the glass 16. The upper link 21 is rearwardly bent at the point 21a to form the aforementioned lug 23 which is connected at the rear end 23a with an upper end 25a of the lower link 25. The lower end 25b of the lower link 25 is pivotally mounted on a bracket 66 as shown in FIG. 6. The upper link 21 is pivotally connected to the upper end portion of the plates 8 and 9 which are secured to the hoop member 13.

Figure 8:
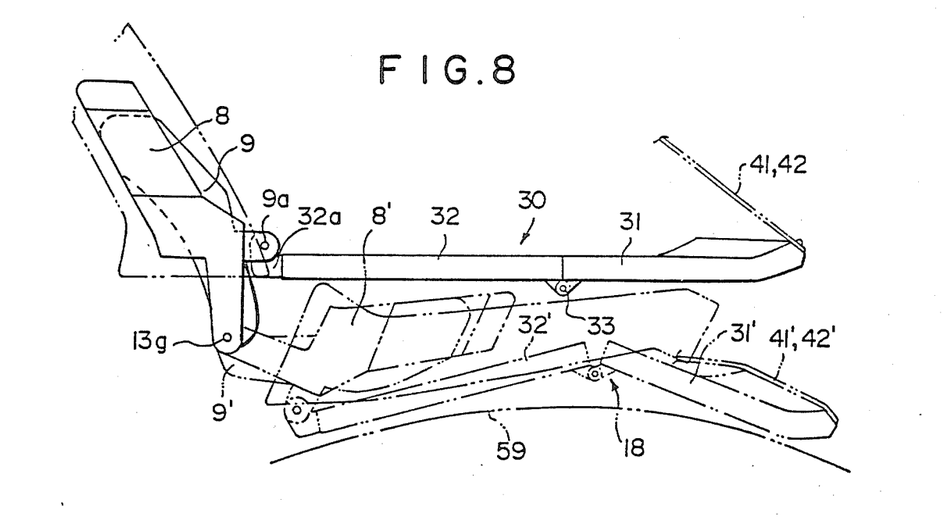
FIG. 8 is a side view of a lower hood tensioning link; operations of the hinge mechanism.

As shown in FIG. 8, the rear link 31 and the front link 32 of the peripheral tensioning linkage 30 are pivotally connected together by a pivot pin 33. The front link 32 has a front end 32a pivotally connected with a rear end 9a of the plate 9. In FIGS. 5 and 8, the linkage 30 is shown in a raised position by solid lines. The linkage 30 is maintained in this position by being pulled up at the rear link 31 by the belts 41 and 42 and at the front ends of the front links 32 by the plate 9 when the hoop member 13 is in the erected position. When the hoop member 13 is swung rearward to open the top of the passenger compartment, the front link 32 is lowered through a rearward swinging movement of the plate 9. At the same time, the belts 41 and 42 are loosened so that the rear link 31 is also lowered to the position shown by phantom lines.

It will be understood that, since the side and rear edge portions of the rear hood 15 are secured to the rear body section 17 at portions lower than the upper edge of the rear body section, it is possible to provide sufficiently wide flexible portions around the rigid glass 16 for making it possible to fold the rear hood 15 in the storing space 18 even when the area of the glass 16 is made large as shown in FIG. 5. When the hoop member 13 is swung rearward, the belts 41 and 42 are loosened so that the rear link 31 of the linkage 30 is allowed to swing downward with the result that the linkage 30 is folded at the pivot pin 33. Thus, the front links 32 and the rear link 31 can lie along the curvature of the tire house panel 59. In the retracted position, the rear edge portion of the glass 16 is placed on the deck 31a of the rear link 31. Thus, it is possible to prevent the glass 16 from being placed inadvertently beneath the peripheral tensioning linkage 30.

Figure 7:
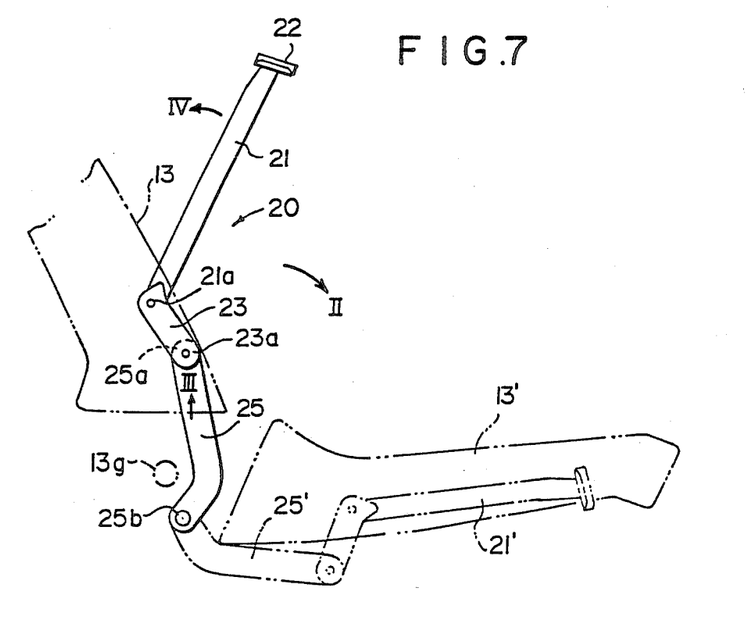
FIG. 7 is a side view of the an upper hood tensioning link.

Referring now to FIG. 7, the linkages are shown by solid lines in positions corresponding to the erected position of the hoop member 13. When the hoop member 13 is swung rearward as shown by an arrow II in FIG. 7, the upper link 21 is moved rearward and the lower link 25 is swung rearward about the pivot point at the lower end thereof. Since the pivot pin 13g for connecting the leg portion of the hoop member 13 is located upward the point of pivot connection between the lower end 25b of the lower link 25 and the rear fender 10, the upper end 25a of the lower link 25 tends to force the rear end 23a of the lug 23 upward as shown by an arrow III in FIG. 7. Thus, the upper link 21 is swung with respect to the hoop member 13 in the direction shown by an arrow IV in FIG. 7 so that the upper link 21 is folded on the hoop member 13 as shown by phantom lines.

Referring to FIG. 8, it will be noted that the plates 8 and 9 are moved by pivoting about the pivot pin 13g to the positions shown by phantom lines 8' and 9' when the hoop member 13 is swung rearward. The movements of the plates 8 and 9 cause the front ends of the front links 32 to move downward. Since the belts 41 and 42 are loosened in this instance as previously described, the rear end of the rear link 31 is also lowered. Thus, the linkage 30 is placed in the lowered position as shown by phantom lines.

The invention has thus been shown and described with reference to specific embodiments, however, it should be noted that the invention is in no way limited to the details of the illustrated structures but changes and modifications may be made without departing from the scope of the appended claims.

We claim:

1. An open top automobile body including a body structure having a front windshield section, a rear body section comprising opposite side panels and a rear section, said rear body section having an upper edge portion defining an open top, a hoop member of a substantially inverted U-shape having a pair of leg portions swingably mounted respectively on the opposite side panels for movement between an erected position wherein the hoop member extends substantially upright and a retracted position wherein the hoop member is retracted in the rear section, a rigid roof panel adapted to be placed between the front windshield section and the hoop member in the erected position, foldable rear hood means having a front edge portion secured to the hoop member and side and rear edge portions secured to said rear body section of the body structure, the improvement resides in that said side and rear edge portions of the rear hood means are secured to the rear body section at portions below the upper edge of the rear body section, substantially U-shaped peripheral hood tensioning link means being provided for movement between an operative position wherein it cooperates with the upper edge of the rear section of the body structure to hold the rear hood means between the link means and the upper edge of the rear body section over substantially an entire outer periphery of the substantial U-shaped peripheral hood tensioning means, and an inoperative position wherein the link means is below the upper edge of the rear body section to release the rear hood means, and moving means beng provided for moving the hood tensioning link means to the operative position when the hoop member is moved to the erected position and to the inoperative position when the loop member is moved to the retracted position.

2. An automobile body in accordance with claim 1 in which the moving means includes means for pivotably connecting leg portions of the hood tensioning link means to the leg portions of the hoop member and flexible belt means connecting an intermediate portion of the link means to an intermediate portion of the hoop member.

3. An automobile body in accordance with claim 1 in which said rear hood means includes a transparent panel and a flexible part around the transparent panel, said hood tensioning link means being provided with means for receiving a rear edge portion of the transparent panel in the inoperative position.

4. An automobile body in accordance with claim 3 in which said receiving means includes deck means formed in an intermediate portion of the hood tensioning link means.

5. An automobile body in accordance with claim 3 in which said receiving means includes at least one forward projection formed in an intermediate portion of the hood tensioning link means.

6. An automobile in accordance with claim 1 in which said rear hood means includes a transparent panel and a flexible sheet around said transparent panel, an upper hood tensioning linkage being provided for engagement with said flexible sheet between the hoop member and the transparent panel to tension the flexible sheet.

7. An automobile body in accordance with claim 6 in which said upper hood tensioning linkage is of an inverted U-shape having a pair of leg portions pivotably connected with the rear body section.

8. An automobile body in accordance with claim 7 in which said leg portions of the upper hood tensioning linkage are connected to the rear body section through lower links.

9. An automobile body in accordance with claim 8 in which said leg portions of the upper hood tensioning linkage are pivotably connected with upper ends of said lower links which are pivotably connected with said rear body section, said leg portions of the upper hood tensioning linkage being pivotably connected with the hoop member.

10. An automobile body in accordance with claim 9 in which each said leg portion of the upper hood tensioning linkage is connected with its respective said lower link at a rearwardly offset position relative to the pivotal connection between the upper hood tensioning linkage and the hoop member.

11. An automobile body in accordance with claim 7 in which the leg portions of the upper hood tensioning linkage are connected to the rear body section at points lower than points where the leg portions of the hoop member are connected with the rear body section.

12. An automobile body in accordance with claim 7 in which said link moving means includes means for pivotably connecting leg portions of the hood tensioning linkage to the leg portions of the hoop member and flexible belt means connecting an intermediate portion of the linkage to an intermediate portion of the hoop member, said flexible belt means being passed through the upper hood tensioning linkage.

13. An automobile body in accordance with claim 1 in which said peripheral hood tensioning link means includes a rear link member of a substantially U-shape having a pair of forwardly extending legs and a pair of front link members having rear ends pivotably connected with the legs of the rear link member and forward end pivotably connected with said hoop member.

14. An automobile body in accordance with claim 1 in which said leg portion of the hoop member has a first plate which is secured at an upper end portion and an intermediate portion of the first plate to the leg portion, a substantially planar second plate being secured at an upper end and a lower end with upper and lower ends of the first plate, the lower ends of the first and second plates being pivotably connected to the rear body section.

15. An automobile body in accordance with claim 13 in which the legs of the rear link member are connected with the front link members through pivot connecting means which allows the front link members to be folded downwardly but prevents the front link members from being folded upwardly from a position wherein the front and rear link members extend substantially straight.

16. An automobile body in accordance with claim 1 in which said rear section of the rear body section includes a substantially transversely extending structure comprising an outer panel and an inner panel which are connected together to form a structure of closed cross-section, the rear edge portion of the rear hood means being connected to a lower surface of the inner panel, said structure of closed cross-section having an upper edge which defines a part of the upper edge portion of the rear body section and carrying seal means for cooperation with the peripheral hood tensioning link means.

17. An automobile in accordanace with claim 16 in which said side panels comprises an outer panel and inner panel which are connected together at upper edges thereof, said side edge portions of the rear hood means being connected to said inner panel of the side panel, said upper edges of the outer and inner panels carrying seal means for cooperation with the peripheral hood tensioning link means.

* * * * *